Nov. 30, 1965  R. J. SENGER  3,220,238
ADJUSTABLE COMPONENT CONFIGURATING APPARATUS
Filed Aug. 23, 1961  8 Sheets-Sheet 3
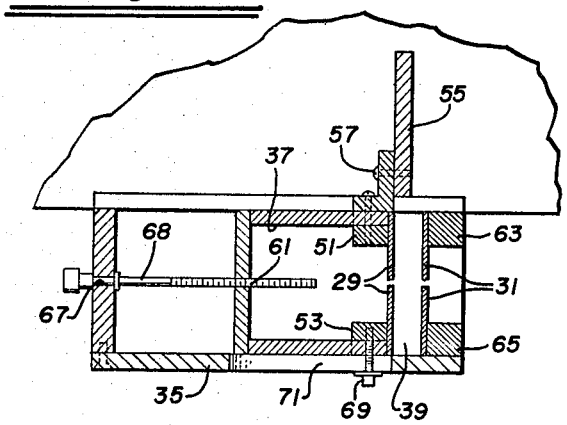
Fig. 3
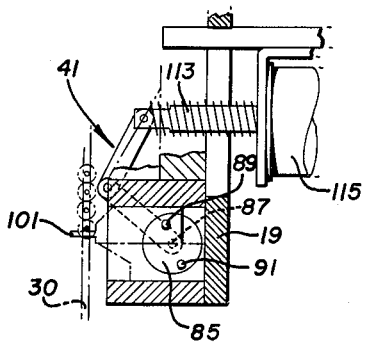
Fig. 4
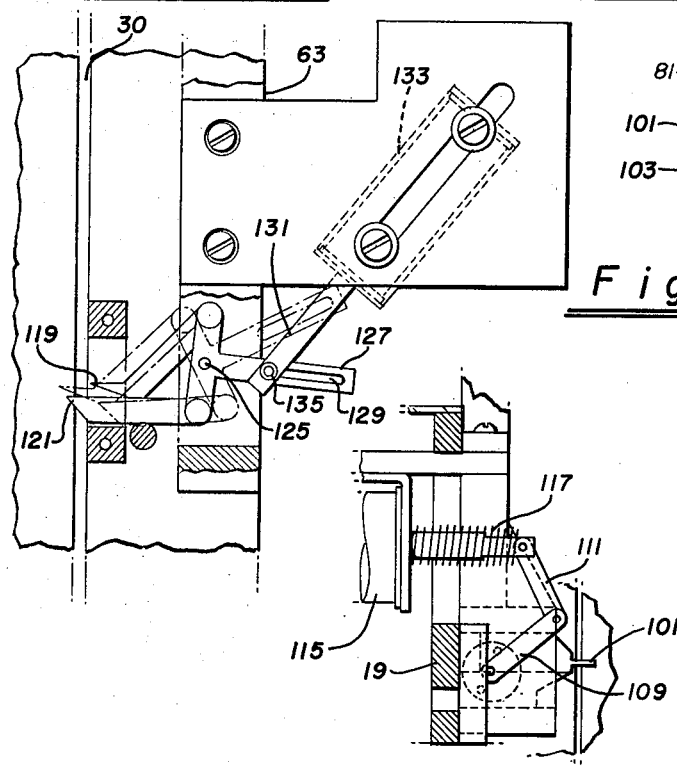
Fig. 8
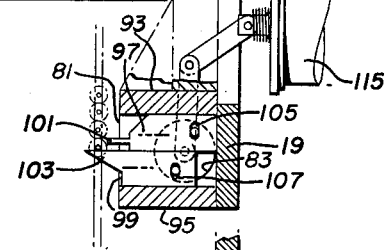
Fig. 6
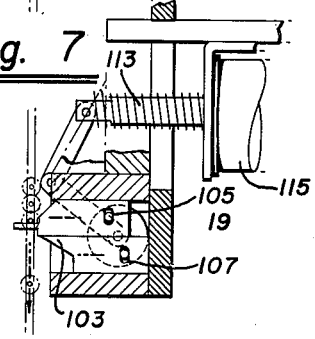
Fig. 7
Fig. 5
INVENTOR.
Raymond J. Senger

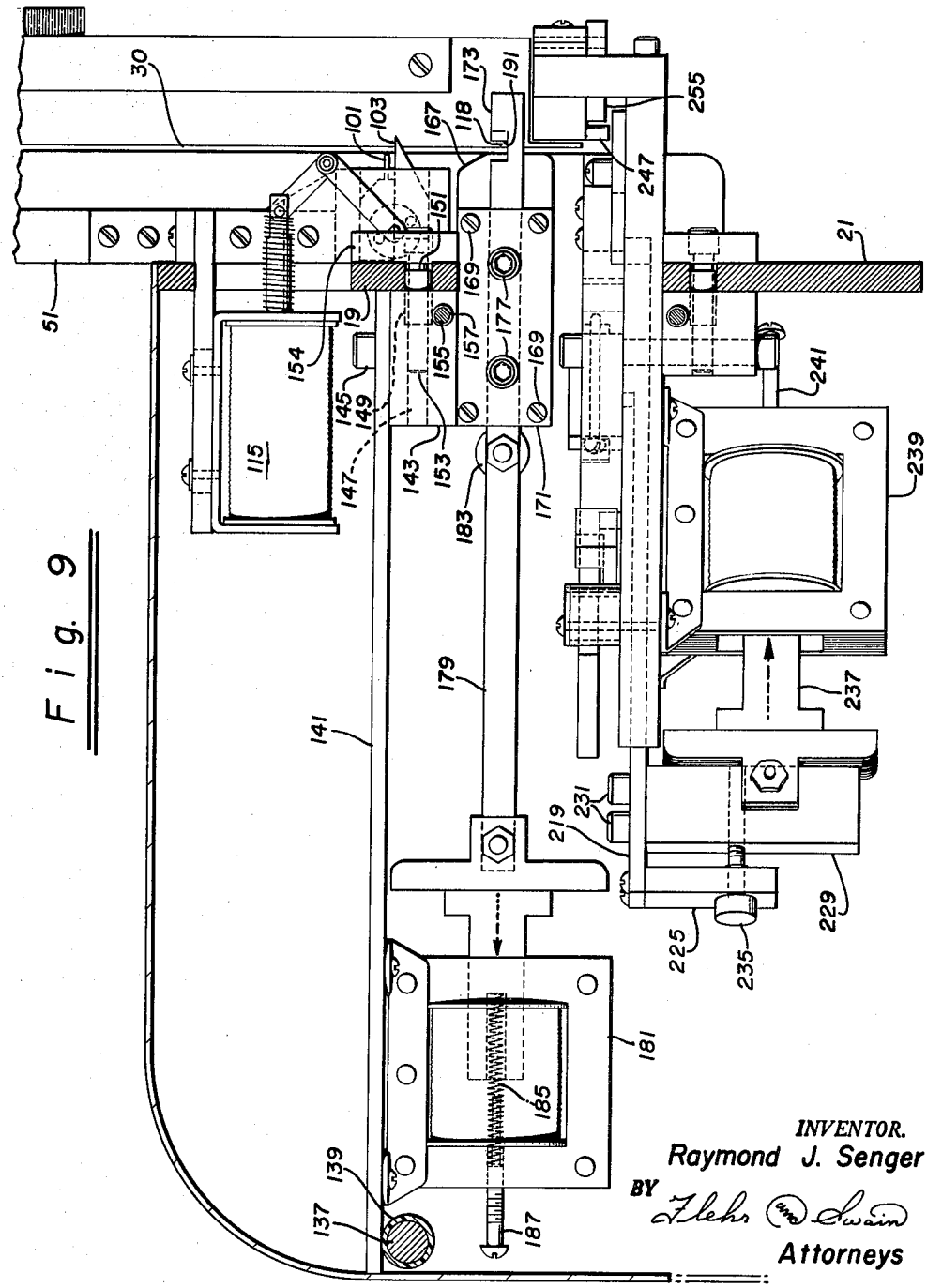

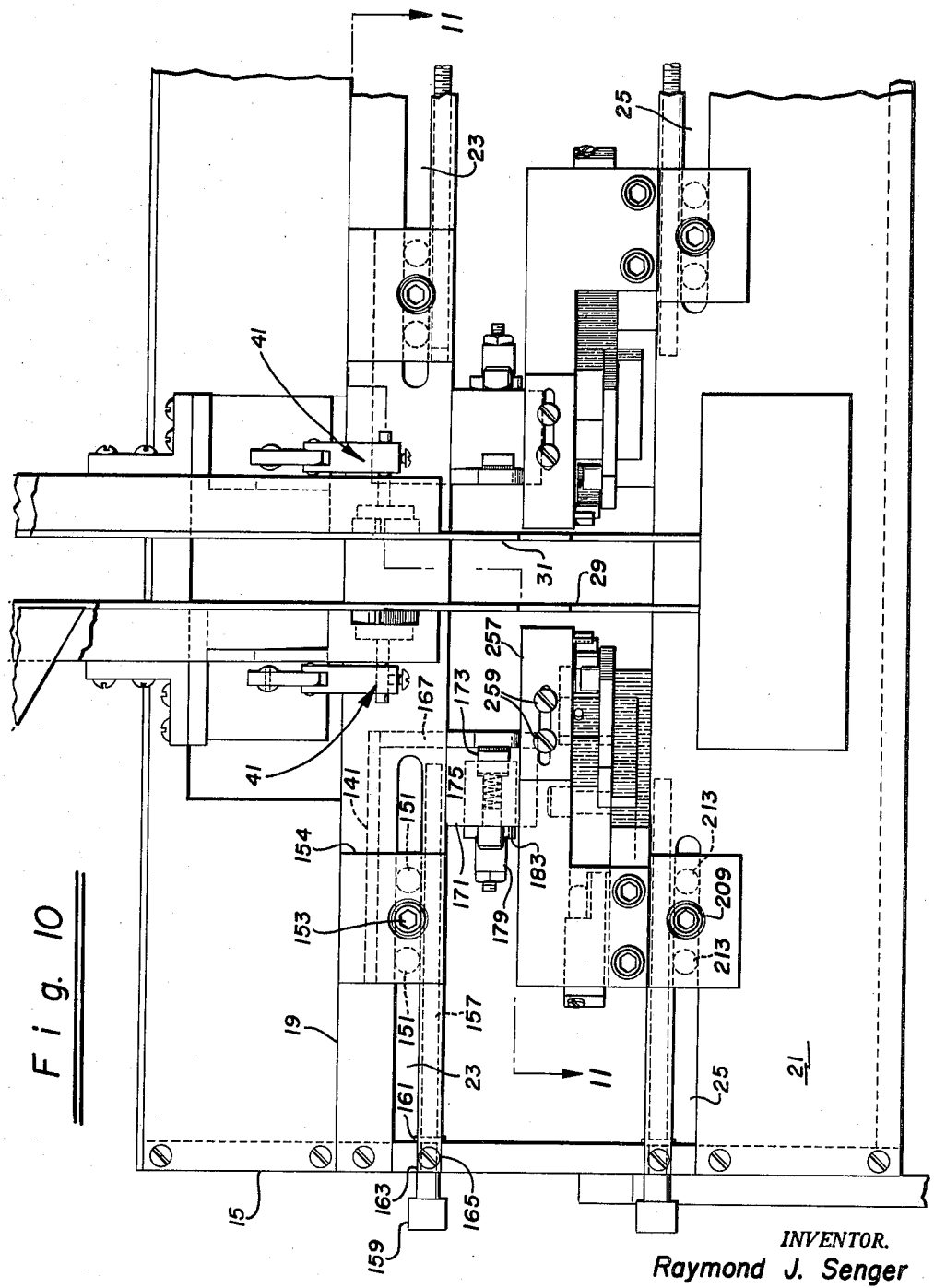

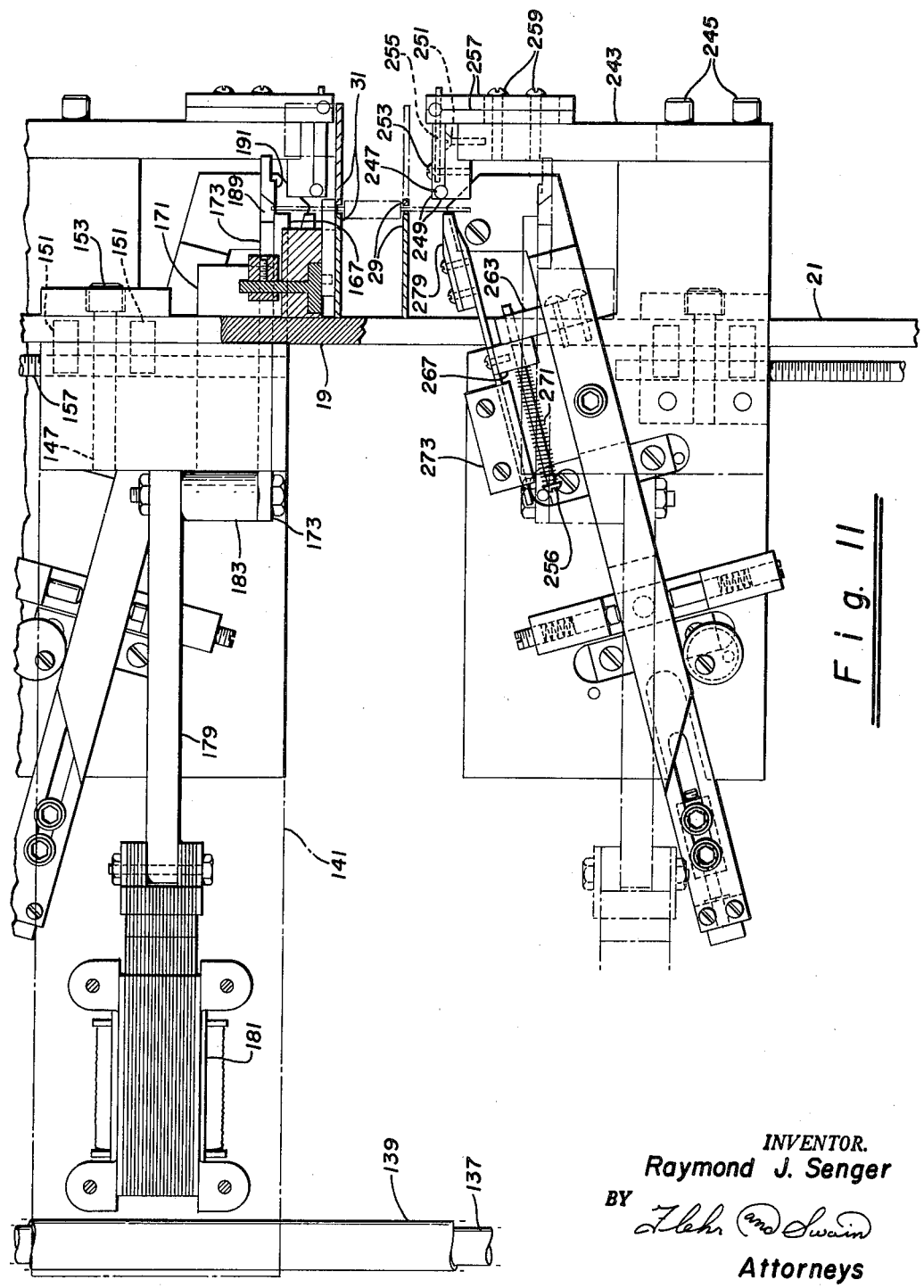

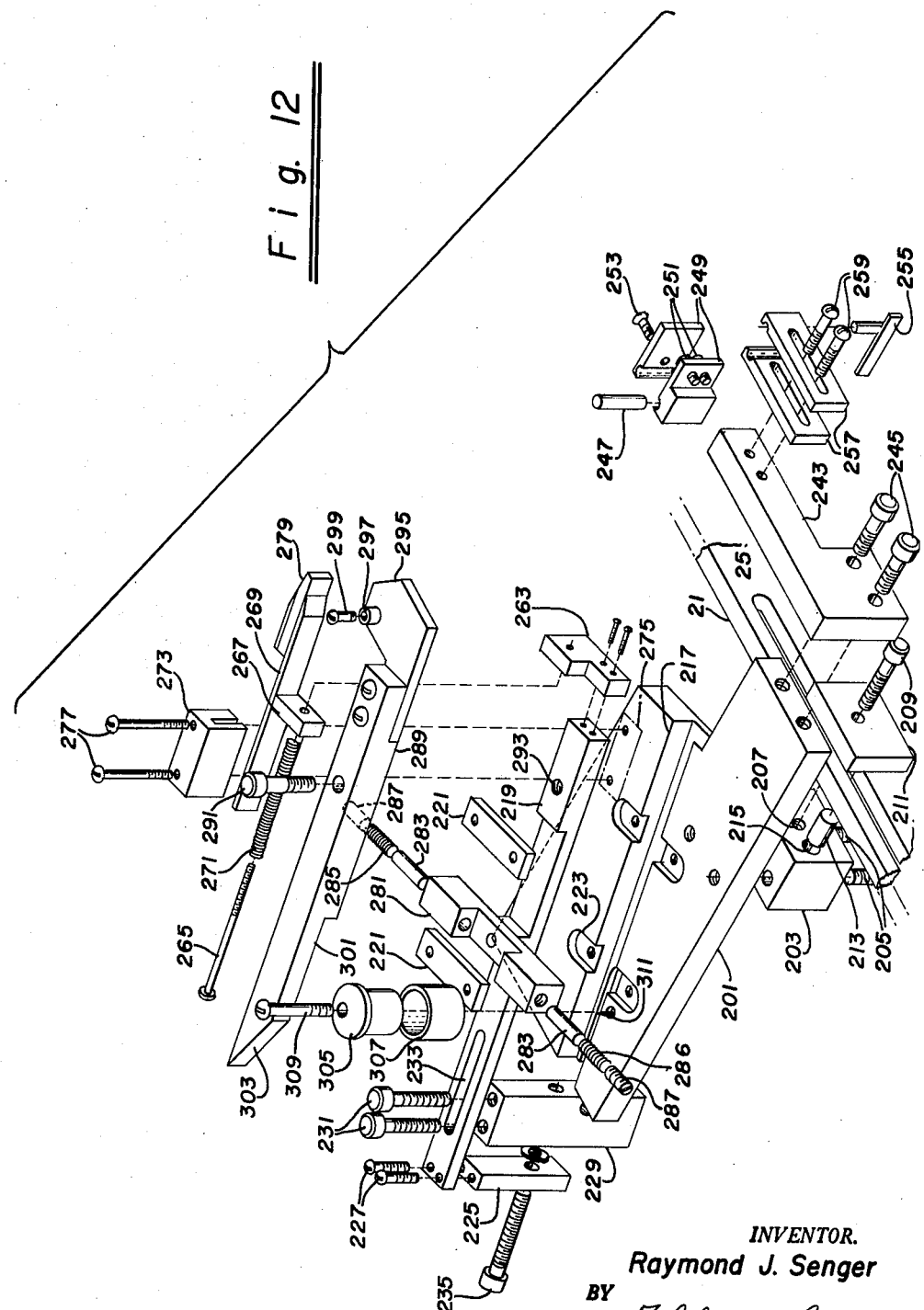

Nov. 30, 1965 R. J. SENGER 3,220,238
ADJUSTABLE COMPONENT CONFIGURATING APPARATUS
Filed Aug. 23, 1961 8 Sheets-Sheet 8
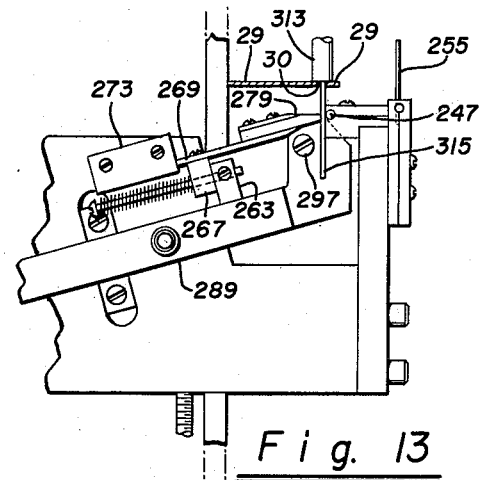
Fig. 13
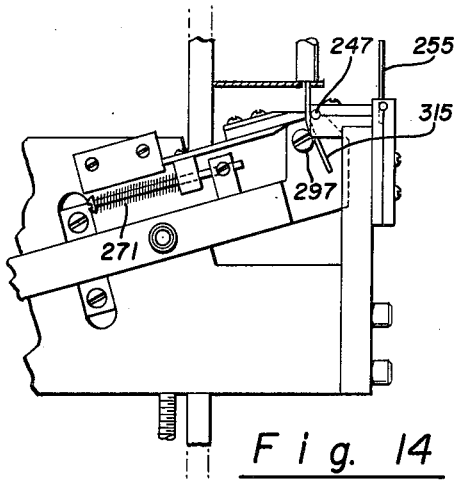
Fig. 14
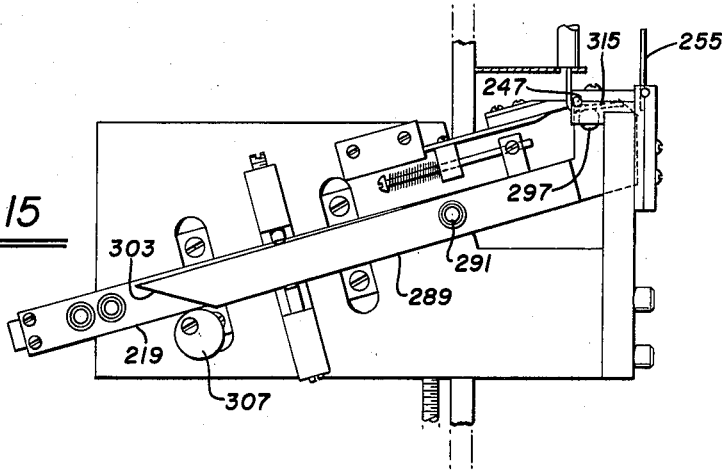
Fig. 15
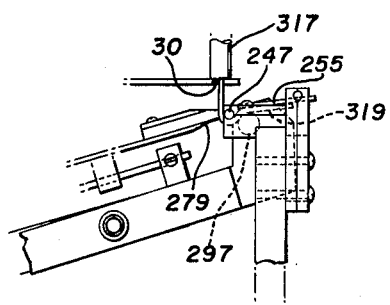
Fig. 16
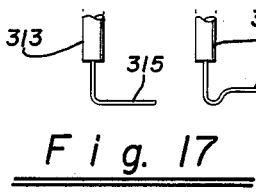
Fig. 17
Fig. 18
INVENTOR.
Raymond J. Senger
BY
Attorneys

United States Patent Office 3,220,238
Patented Nov. 30, 1965

3,220,238
ADJUSTABLE COMPONENT CONFIGURATING APPARATUS
Raymond J. Senger, Palo Alto, Calif., assignor to Develop-Amatic Engineering, Palo Alto, Calif., a corporation of California
Filed Aug. 23, 1961, Ser. No. 133,524
7 Claims. (Cl. 72—381)

This invention relates to a component configurating apparatus and more particularly to apparatus for shaping the leads of various size components into any of several different configurations.

While there have been many machines developed in the prior art for configurating the axial leads of various electronic components most of these machines have had a disadvantage in that each was designed for a particular size component and was likewise designed to configurate the leads thereof in a particular fashion. Although some of the machines of the prior art have been adjustable in these respects the adjustments have usually been extremely difficult and often required the exchange of machine parts.

Moreover, in the machines of the prior art the type of configuration has been limited to simple singular bends spaced a relatively long distance from the component itself. Moreover, the bends produced by the machines of the prior art have caused frequent component rejects due to lead scarring. In addition many of the prior art machines had to be hand fed or required extremely complicated feed systems for the individual components. These various disadvantages often made operation of the prior art machines relatively uneconomical.

It is therefore a general object of this invention to provide an improved component configurating apparatus.

It is a more particular object of this invention to provide a component configurating apparatus having a simplified component feed.

It is another object of this invention to provide a component configurating apparatus which will accept components as delivered by a manufacturer and completely configurate them by cutting the leads to a required length and bending the cut leads to a desired shape.

It is still another object of this invention to provide a component configurating apparatus having the aforementioned characteristics wherein damage to the leads is minimized or totally absent.

A further object of this invention is to provide a component configurating apparatus of the aforementioned character which will accept components of various dimensions.

It is still a further object of this invention to provide a component configurating apparatus having the aforementioned characteristics which is capable of configurating the leads into a variety of shapes.

It is another object of this invention to provide a component configurating apparatus of the aforementioned character which is completely automatic.

It is still another object of this invention to provide lead shaping apparatus for configurating leads in various forms without marring the leads themselves.

It is still another object of this invention to provide a component configuration of the aforementioned character wherein the leads may be bent extremely close to the component body itself.

Generally the above objects of the invention are accomplished with a machine having an elongated chute through which the components may slide downwardly by means of gravity. The chute includes slits along opposite sides thereof through which the components axial leads extend. The slitted sides of the chute are adjustable whereby various size component bodies may be accommodated. Along the outside of the chute and near its lower end in close relationship with the slits are a number of operating stations. The first of these operation stations is a stepper which permits passage of a single component at a time. The stepper may be attached to the sides of the chute itself.

A second station below the stepper is a cutting station which may be laterally adjusted independent of the chutes. There is a cutting station on each side of the chute which is independently adjustable whereby the axially extending leads of the component may be cut off to a desired length.

Beneath the cutting stations are a pair of bending stations one on each side of the chute which, like the cutting stations, may also be adjusted independently. Thus, the bends on the axial lead may be located at different distances from the component body. In addition, each of the bending stations is itself independently adjustable whereby a different configuration may be applied to each lead of the component.

The above-mentioned and other objects of the invention will become more clearly understood upon a review of the following detailed description in conjunction with the accompanying drawing, in which:

FIGURE 3 is a sectional view taken along the lines 3—3 of FIGURE 1;

FIGURE 4 is a detailed elevational view of one type of stepper unit which may be used in accordance with this invention, the view being taken along line 4—4 of FIGURE 1;

FIGURE 5 is a detailed side elevational view of the stepper unit of FIGURE 4 shown on the opposite side;

FIGURE 6 is a detailed view of the fingers of the stepper unit shown in one extreme position;

FIGURE 7 is a detailed view of the fingers of the stepper unit shown in a second extreme operating position;

FIGURE 8 is a detailed side elevational view of a stepper in accordance with another embodiment of the invention;

FIGURE 9 is an enlarged and detailed side elevational view of the component configurator shown in FIGURE 2 with the side cover removed;

FIGURE 10 is a front plan view in enlarged scale of the apparatus shown in FIGURE 2;

FIGURE 11 is a detailed plan view of the cutting and bending stations used in the component configurator shown in FIGURES 1 and 2;

FIGURE 12 is an exploded perspective view of one of the bending stations shown in FIGURE 12;

FIGURES 13, 14 and 15 are operational views of the bending station shown in FIGURES 11 and 12;

FIGURE 16 is another operational view of a bending station shown in FIGURE 13 wherein a different type of bend is performed;

FIGURE 17 is a plan view of a component configurated in one of the forms possible with the apparatus in accordance with the invention; and FIGURE 18 is the plan view of the component configurated in another form possible with the apparatus in accordance with the invention.

Figure 1:
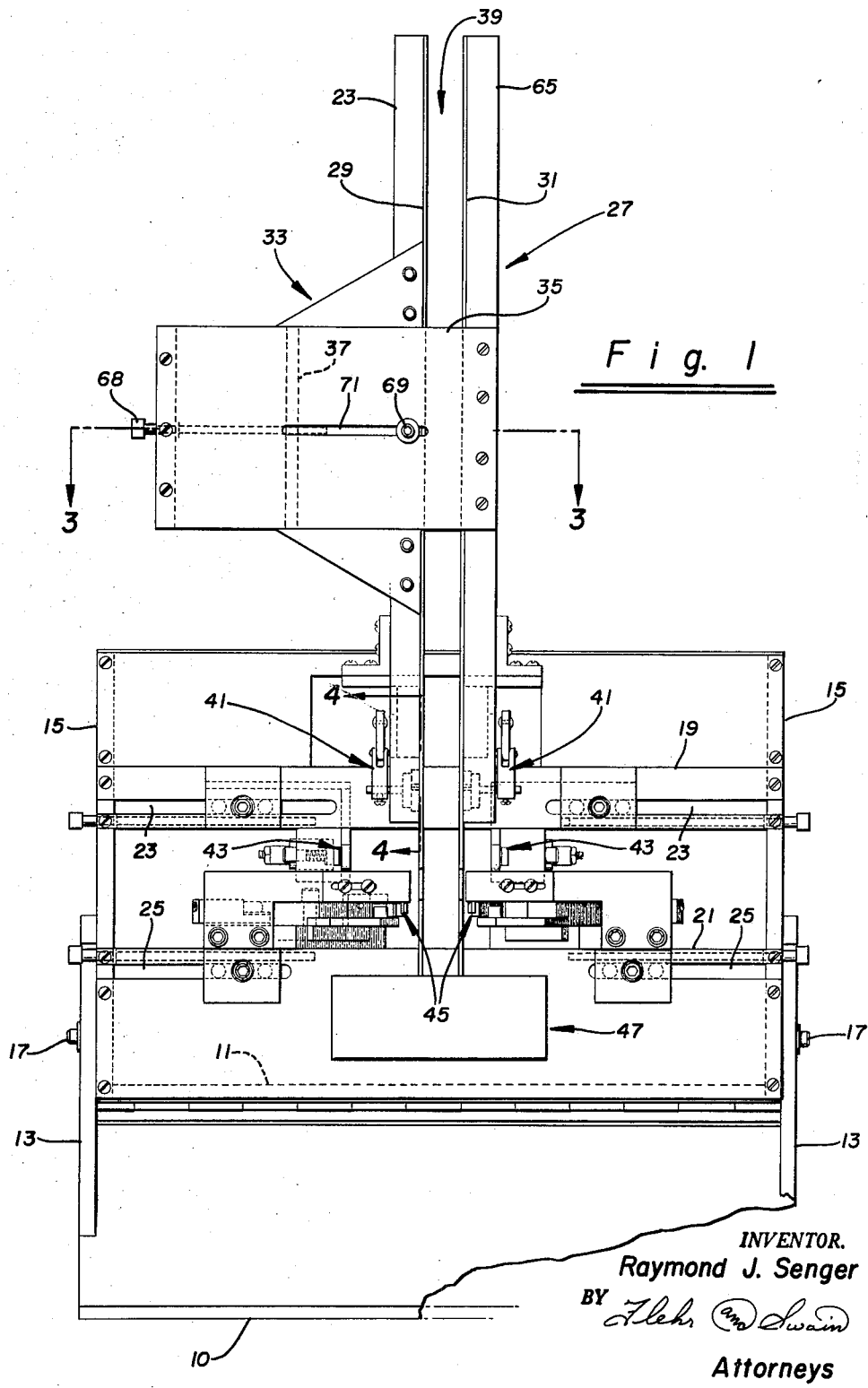
FIGURE 1 is a view taken along the line 1—1 of FIGURE 2.
Figure 2:
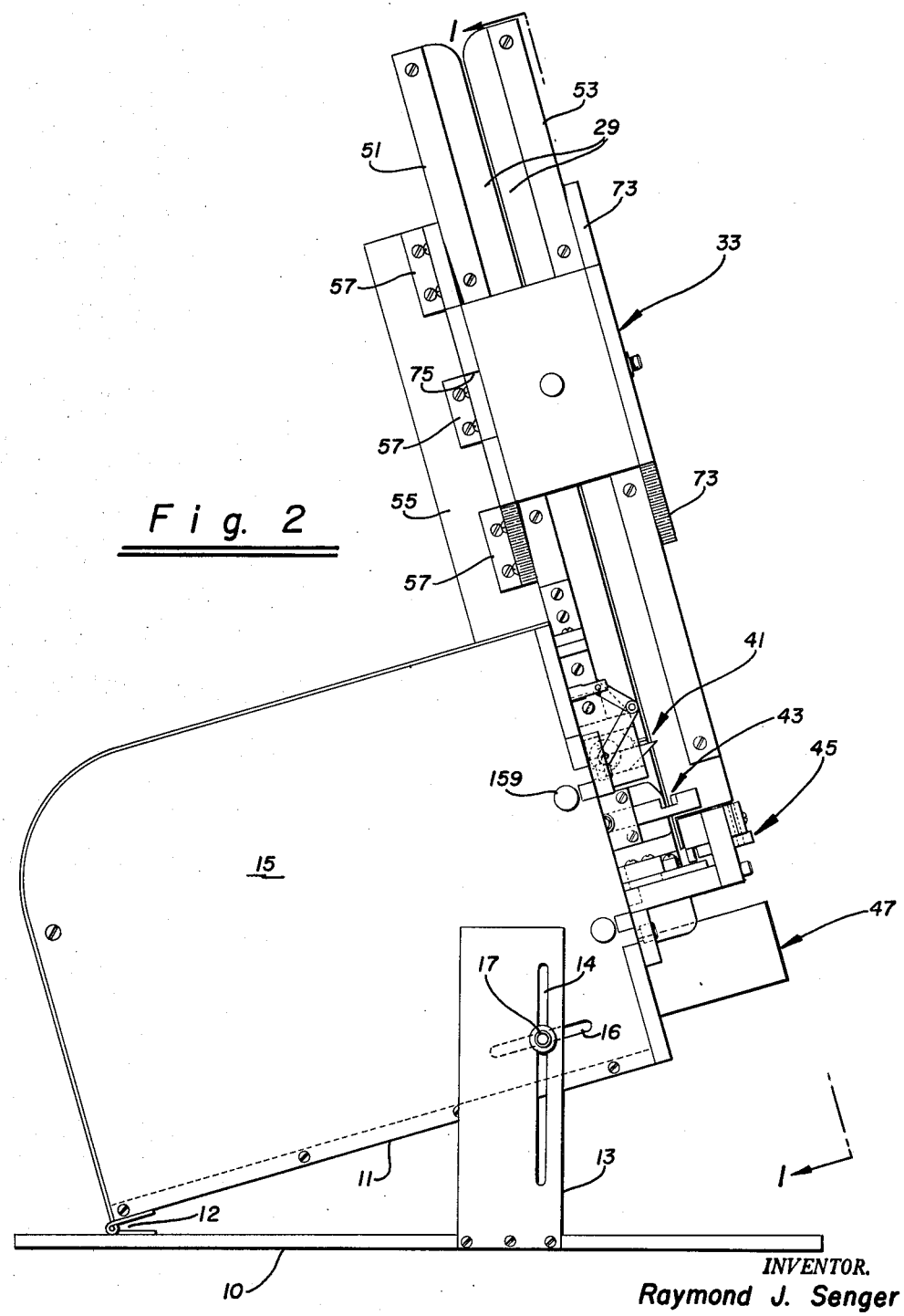
FIGURE 2 is a side elevation of a component configurating apparatus in accordance with one embodiment of this invention.

Referring to FIGURES 1 and 2, the general orientation of the apparatus can be realized. A stationary base 10 is connected to a secondary base 11 by means of a hinge 12. The stationary base includes upright standards 13 having slots 14 while the secondary base 11 includes upright side members or covers 15 having slots 16 therein. As is apparent, the relative angle between the stationary base 10 and the secondary base 11 can be adjusted and locked by means of a lock 17 passing through the slots 14 and 16.

Across the front of the upright members 15 are connected lateral supports 19 and 21, each having horizontal slots 23 and 25 respectively cut therein.

A chute 27 is located in front of the lateral supports 19 and 23 and one side 29 of the chute is rigidly secured to the secondary base as will be seen hereinafter. Each side of the chute includes a longitudinal slit 30 through which the axial leads of components may pass and thus components may be guided down the chute along the longitudinal slits. The other side 31 of the chute is held parallel to the side 29 by means of a bracket 33.

The bracket 33 includes an outer box section 35 rigidly secured to the chute side 31 and an inner box section 37 fitted within the section 35 and secured rigidly to the chute side 29. As will be described more clearly hereinafter the sections 35 and 37 are held in fixed but adjustable relationship whereby the space 39 between the chute sides 29 and 31 is adjustable.

Near the lower end of the chute 27 there is a first stepper station 41 which serves to pass components within the chute one by one to the stations therebelow. The stepper units are preferably affixed to the chute side themselves rather than to the lateral support 19. The second or lead cutting station 43 is located along the outside of the chute 27 and is disposed below the stepping station. A third or lead bending station 45 is located below the cutting station. If desired a fourth or testing station, designated schematically as 47, may be located along the chutes below the bending station 45. Preferably each of the above mentioned stations is located relatively close to the next whereby the time required for a component to drop from one station to the next is minimized.

Referring to FIGURE 3 along with FIGURES 1 and 2 means are shown for varying the space 39 between the chute sides 29 and 31. The sides 29 are attached to elongated rigid members 51 and 53 and the member 51 is affixed to an upright brace 55 by means of angle brackets 57. The brace 55 is secured to the secondary base 11 by means of angle brackets (not shown).

The inner box section 37 holds the members 51 and 53 in parallel relationship. The outer box section 35 fits about the inner box section 37 and holds the members 63 and 65 parallel. The end of the outer box section 35 opposite the members 63 and 65 includes an opening 67 through which a bolt 68 is axially retained but rotatably free. The bolt 68 engages a threaded opening 61 in the inner box section 37 and upon rotation of the bolt and relative location of the section 37 and 35 is slideable to adjust the width of the space 39.

The chute sides 29 are secured to the elongated member 63 and 65. A set screw 69 is passed through a slot 71 in the front wall of the box member 35 and engages the threaded opening in the elongated member 53. After adjusting the width of the space 39, the position of the section 35 and 37 may be locked by means of the set screw 69.

A pair of guides 73, extending above and below the front wall of the box section 35 and secured to the member 53 provides a smooth sliding surface for the adjustment motion. In addition, the box member 35 includes an opening 75 in its rear wall to permit passage by the short angle 57 which also acts a guide surface. Thus, it is seen that the space 39 between the chutes 29 and 31 may be easily adjusted and set.

Referring now to FIGURES 4, 5, 6 and 7, a preferred embodiment of a stepper 41 is shown. Generally, the stepper units are affixed to the elongated members 51 and 63 (FIGURES 2 and 9). As seen in the figures the stepper includes a base member 81 including a circular recess 83 in which is located a disc 85 having an oscillatory axle 87 and diametrically opposed pins 89 and 91. Secured to the base member 81 are a pair of parallel guides 93 and 95 above and below the disc 85 respectively. Located between the guides 93 and 95 are a pair of finger bodies 97 and 99 having extended fingers 101 and 103 respectively. Each of the bodies 97 and 99 includes an elongated slot 105 and 107 which cooperates with one of the pins 89 or 91. The bodies 97 and 99 are dimensioned such that together they fit between the guides 93 and 95 with a free sliding fit. In rotating the disc 85, by rotating its axle 87, the pins 89 and 91 cause alternate reciprocation of the fingers 101 and 103. The fingers 101 and 103 are dimensioned such that when in the netural position shown in FIGURE 4, both of the fingers 101 and 103 extend fully across the slit 30.

As can be seen in FIGURE 6 when the shaft 87 is rotated to one extreme and finger 101 is completely retracted from the slit 30 while the finger 103 as well as a portion of the finger body 99 extends across the slit. On the other hand when the axle 87 is rotated to its opposite extreme the finger 103 is entirely retracted from the slot 30 while the finger 101 and a portion of the finger body 97 extends across the slit.

The oscillating action of the axle 87 is accomplished by the means of a solenoid as shown in FIGURE 5. A crank arm 109 is rigidly secured to the axle 87 and a link 111 has one end pivoted at the plunger 113 of a solenoid 115. Thus, it is seen that upon energization of the solenoid 115 the axle 87 is rotated in a counterclockwise direction as shown in FIGURE 5. Upon the release of the solenoid 115, a spring 117 urges the plunger 113 to the right and causes the axle 87 to rotate clockwise.

In the operation of the stepper unit the normal position of the fingers 101 and 103 is retained by the spring 113 and is as shown in FIGURE 6. Thus, when a plurality of components are placed in the chute with their axial leads extending through the slits 30 the lowermost leads is retained by the fingers 103. On activating the solenoid 115, the finger 101 extends outwardly and inserts itself between the lowermost and the next lowermost lead whereby the stack of components is held by the leads of the second component. Simultaneously, the finger 103 retracts to the position as shown in FIGURE 7 whereby the lowermost component is dropped. Thus, it is apparent that upon sequential energization of the solenoid 115, components may be lowered through the chute one at a time at a speed dependent upon the operation of the solenoid.

An alternate type of stepper unit is shown in FIGURE 8 wherein a plurality of fingers 119 and 121 are pivotally secured to a link 123. The link 123 is pivoted at 125 and includes a centrally disposed arm 127 having a slot 129 therein. The plunger 131 of a solenoid 133 includes a pin 135 extending through the slot 129. Thus, it is seen that upon energization of the solenoid the various components of the stepper assume the position shown in dashed lines in FIGURE 8. The plunger 131 may be resiliently urged to the position shown in solid lines.

Thus, in the operation of the alternate stepper unit the fingers 119 and 121 alternately extend across and retract from the slit 30 in the chute. The operating result of the alternate stepper unit is the same as that for the unit shown in FIGURES 4 to 7.

Referring to FIGURES 9, 10 and 11 a cutter station is shown in more detail. In general the cutter stations are adjustably secured to the cross member 19 and are suspended at the rear by a bar 137 having a sound deadening covering 139. FIGURE 10 shows the wire cutting stations on each side of the chute while FIGURE 9 shows only the station on the left side and FIGURE 11 shows only the station on the right side of the chute.

A plate 141 securely holds the operating parts of the cutting station. It is the plate 141 which is adjustably secured to the cross member 19 and which rests on the bar 137. A block 143 is secured below and at the forward edge of the plate 141 by means of bolts 145 or the like. The block 143 includes a tapped opening 147 and a pair of bores 149 all aligned in a plane generally parallel to the plate 141. Alignment pins 151 are inserted in the bores 149 and the extending ends of the pins are located in the slot 23 of the cross member 19 to prevent rotation of the plate 141 about the tapped opening 147.

A set screw 153 passes through a clamp plate 154 and the slot 123 to cooperate with the threaded opening 147 and secure the lead cutting station once it has been adjusted.

The block 143 also includes a threaded opening 155 which cooperates with the screw 157. The screw 157 includes a knurled head 159 and a collar 161 as well as a shoulder 163. The portion of the screw between the shoulder 163 and the collar 161 is passed through the upright member 15 and the set screw 165 is employed to limit axial movement of the screw. Thus, upon rotation of the knurled head 159 the cutting station is traveled along the slot 23.

Also secured to the plate 141 is a cutting anvil 167. As can be seen more clearly in FIGURE 9 the front edge of the cutting anvil is in registry with the rear edge of the slit 30. Secured to the anvil 167 by means of screws 169 is a cutter guide block 171. A cutter blade 173 extends through the guide block 171 and is resiliently and laterally urged against the anvil 167 by means of springs 175 (FIG. 10) retained in the guide block with backing screws 177.

The rear end of the cutter block 173 is connected to the plunger 179 of a solenoid 181 by means of a bolt and spacer assembly 183. As can be seen more clearly in FIGURE 9 the plunger 179 is resiliently urged to the right by a spring 185 and its travel to the left may be limited by the adjustable screw 187.

The forward edge of the cutter 173 includes a recess 189 having a sharp edge 191 in registry with the anvil. Thus, it is seen that after release of the component from the finger 103 an axial lead of the component falls into recess 118. Upon activation of the solenoid 181 the cutter blade 173 is drawn against the anvil 167 with the axial lead therebetween thus shearing off the lead. The distance of the anvil 167 and cutter blade 173 from the chute may be easily adjusted by releasing the set screw 153, adjusting the screw 157 and retightening the set screw 153. Thus, the leads may be cut to any length desired. Moreover, it is apparent particularly upon viewing FIGURE 10 that one or both of the cutter stations may be moved directly adjacent the chute sides 29 and 31 whereby a minimum length of the lead may be left on the component, the minimum being the thickness of one of the chute sides and the anvil 167. Since all of the forces involved in the cutting action are in compression along the plane of the anvil 167 it is apparent that the anvil as well as the chutes themselves may be of extremely thin material whereby the leads may be cut particularly short.

While the lead bending station is also shown in FIGURES 9 and 11 it is more clearly shown in the exploded view of FIGURE 12. Referring to FIGURE 12 it is seen that the wire bending station includes a base member 201 which is disposed to override the cross member 21. A mounting block 203 is connected to the base member 201 by means of screws 205. A threaded opening 207 cooperates with a screw 209 to clamp the block 203 and the front plate 211 against the cross member 21 to secure the position of the bending station. Pins 213 are fitted in bores 215 in the clock 203 and extend into the slot 25 to prevent twisting movement of the base 201 about the screw 209.

The base 201 includes a diagonal groove 217 in which rides a ram 219. The ram 219 is held within the groove 217 by means of the plates 221 which are retained in the cut-outs 223 by means of screws or the like. An adjustment block 225 is secured to the rear end of the ram 219 by means of the screws 227. A drive block 229 is also secured to the ram 219 by means of the screws 231 through the elongated slot 233. The position of the drive block 229 with respect to the slot 233 is adjusted by means of the screw 235 passing through the adjustment block 225 and threadably engaging the drive block 229.

As can be seen more clearly in FIGURE 9 the drive block 229 is secured to the plunger 237 of the solenoid 239, which is retained on the underside of the base 201. The position of the ram 219, when the plunger 237 is fully extended to the left (FIGURE 9), can be adjusted by means of the screw 235 and set by means of the screws 231. The travel of the solenoid may be adjusted by means of the screw 241. Thus, the extreme portions of the ram 219 can be simply adjusted.

Secured to the front end of the base 201 by means of the screws 245, is an anvil block 243. An anvil 247 is secured to the block 243 by means of clamps 249, the screws 251, and the clamping screw 253. A second anvil 255 may be secured to the block 243 by means of clamps 257 and screws 259.

Secured to the front end of the ram 219, is a plate 263 which threadably receives an elongated screw 265. An arm 267 of a slide 269 slidably receives the screw 265 and a spring 271 is disposed about the screw 265 between the head thereof and the arm 267. Thus the arm 267 is resiliently urged to the right against the plate 263 as shown in FIGURE 11.

The slide 269 is received by a guide 273 which is secured to the base 201 at the area 275 by means of the screws 277. The forward end of the slide 269 includes an anvil 279 preferably made of the somewhat resilient material. As can be seen more clearly in FIGURE 11, the anvil 279 is directed toward the anvil 247 which also has a resilient outer surface.

Thus it is seen that as the ram 219 is urged to the right as shown in FIGURE 11 the anvil 279 is resiliently urged toward the anvil 247.

Pivotally affixed to the ram 219 is a spring block 281. The spring block 281 includes a pair of pins 283 resiliently urged towards the center of the block by the springs 285 and 286 and which are backed by the screws 287. A bending arm 289 is pivotally secured to the ram 219 by means of the bolt 291 placed in the threaded opening 293. The rear end of the arm 289 rides in the spring block 281 and is resiliently retained by the springs 285 and 286. The forward end of the arm 289 includes an offset portion 295 having a bending anvil affixed thereon including a resilient tube 297 and a screw 299. The rear end of the arm 289 includes a cut out portion 301 for clearing the bottom of the spring arm 281. Also included at the rear of the arm 289 is a cam surface 303 which will be explained more fully hereinafter.

The spring 285 is preferably stronger than the spring 286 whereby the arm 289 is urged in a counterclockwise direction about the screw 291. To prevent this counterclockwise rotation an eccentric 305 surrounded by a sleeve 307 and retained by a screw 309 in the threaded opening 311 is adjusted to ride against the side of the arm 289. As the ram 219 moves forward (to the right as shown in FIGURE 12), the arm 289 moves therewith. As the cam surface 303 reaches the eccentric sleeve 307 the operation of the stronger spring 385 causes the arm 289 to rotate in the counterclockwise direction. The position of the cam surface 303 is such that the counterclockwise rotation of the arm occurs when the bending anvil 297 is in the proximity of or beyond the stationary anvil 247.

The solenoid 239 may include spring means for returning the plunger 237 to the left (FIGURE 9) when the solenoid is not energized. Alternatively, the spring 271 may provide the functions. When the energized solenoid urges the ram 219 and the screw 265 to the right, the movement of the anvil 279 is rotated by the anvil 247.

Thus the spring 271 is placed under therein. When the solenoid is deenergized the spring urges the ram 219 to the left and the inertia of the moving ram is sufficient to back the anvil 279 itself away from the stationary anvil 247.

Referring to FIGURES 13, 14 and 15, operation of the wire bending station can be more clearly seen. Thus, in FIGURE 13 a component 313 has an axial lead 315 extending through the slit 30 in the chute side 29. The stationary anvil 247 is disposed in close proximity to the lead 315. As the ram 219 and the arm 289 move to the right the clamping anvil 279 urges the lead 315 away from the back of the slit 30 and against the anvil 247. Thus, the clamping anvil 279 clamps the lead 315 against the stationary anvil 247.

As the ram 219 and arm 289 continue their movement to the right the clamping anvil 279 remains stationary and the spring 271 is compressed. The bending anvil 297 continues movement contacting the lead 315 and bending it about the stationary anvil 247. It should be noted that during this time the straight portion of the side of the arm 289 is contacting the sleeve 307.

As movement of the ram 219 proceeds even further the cam surface 303 contacts the sleeve 307 as shown in the FIGURE 15. The arm 289 then begins to rotate counterclockwise about the screw 291 and the bending anvil 297 moves in a generally upward direction as shown in FIGURE 15. Thus, the lead 315 is bent backwards about the anvil 247. The degree of backward movement about the anvil 247 can be easily adjusted by adjusting the eccentric sleeve 307 as well as by adjusting the stroke length of the ram 219.

In a bending operation as shown in FIGURE 15, although the lead is bent more than 90°, upon retraction of the anvil 297 the resilient nature of the lead will cause it to contract into the condition as shown in FIGURE 17 wherein a right angle bend is completed. If the final configuration should be more or less than a right angle bend, the movement of the bending anvil 297 should be adjusted accordingly.

Referring to FIGURE 16, the bending station is shown as being set up to make a composite bend in the lead such as shown in FIGURE 18. In this instance the component 317 has an axial lead 319 extending through the slit 30 and the clamping anvil 279 retains the lead against the stationary anvil 247. In this instance however, the adjustable anvil 255 is shown positioned in the proximity of the stationary anvil 247 rather than out of the way as shown in FIGURES 13, 14 and 15. Thus, as the bending anvil 297 proceeds in its upward direction urging the lead 319 about the stationary anvil 247, the end of the lead 319 is retained by the adjustable anvil 255. Thus, the composite bend is completed.

In the operation of the overall device a string of components such as resistors may be mounted in the chute with the axial leads extending through the slits 30, thus forming a stack of components in the chute. The stack is retained in place by means of the stepper and one component at a time is permitted to pass therebelow. As each component passes down, its axial leads are first cut to the length predetermined by the position of the cutting units along the slots 23. After the leads are cut the component drops still further until it rests upon a plate 295 at which time the axial lead is clamped and bent to the proper configuration as preadjusted by the position of the bending station in the slots 25 and also by the present stroke length and the position of the eccentric tube 307. After the leads of the component are configured it is released from the bending station and drops to the bottom of the chute.

Means may also be added if desired to provide a testing station for the component as it is dropped from the bending station. At which point the totally configurated lead may be tested.

All of the above operations may be accomplished simultaneously in the machine such that different components may be stepped, cut, bent and tested simultaneously. To this end means should be provided for applying simultaneous pulses to each of the solenoids of the machine.

I claim:

1. A component configurating apparatus comprising a base member, a ram slidably mounted in said base member, an arm pivotally secured to said ram and resiliently urged in alignment with said ram, a first anvil fixedly secured to said base member, a second anvil resiliently secured to said ram for movement axial therewith and in alignment with said first anvil whereby a portion of a component to be configurated may be held between said first and second anvils, a third anvil secured to said arm, cam means secured to said base member in proximity with said arm and cam follower means on said arm disposed for cooperation with said cam means for permitting said third anvil to swing about said first anvil to bend that portion of the component extending beyond the first and second anvils, and means for traveling said ram longitudinally along said base member.

2. A component configurating apparatus as defined in claim 1 together with a plurality of upwardly extending slitted guides forming a chute, a member extending transversely across said guide having a slot therein, said base member being adjustably secured within said slot.

3. A component configurating apparatus as defined in claim 1 wherein each of said anvils includes a resilient surface for contacting the component.

4. A component configurating apparatus as defined in claim 1 together with additional anvil means secured to said base member for selective adjustment toward and away from the path of said third anvil.

5. A component configurating apparatus as defined in claim 4 wherein said additional anvil means includes an elongated strip pivotally secured to said base member.

6. A component configurating apparatus as defined in claim 1 together with slide means resiliently secured to said ram, said slide means being slidable in alignment with said first anvil.

7. A component configurating apparatus as defined in claim 6 wherein said slide member includes a leading resilient portion for compressing a lead between said anvil secured to the base member and itself.

References Cited by the Examiner

UNITED STATES PATENTS

| | | | |
|---|---|---|---|
| 2,369,827 | 2/1945 | Holister | 140—104 |
| 2,450,920 | 10/1948 | Shand | 140—71 |
| 2,458,536 | 1/1949 | Sherman | 140—104 |
| 2,650,634 | 9/1953 | Young et al. | 153—2 |
| 2,713,362 | 7/1955 | Stahl | 140—71 |
| 2,838,111 | 6/1958 | Baltus | 153—2 |
| 2,845,161 | 7/1958 | Lerch | 193—32 |
| 2,971,544 | 2/1961 | Newman | 140—71 |
| 2,994,420 | 8/1961 | Tobias | 193—32 |

CHARLES W. LANHAM, *Primary Examiner.*